(12) United States Patent
Chang et al.

(10) Patent No.: US 11,821,910 B2
(45) Date of Patent: Nov. 21, 2023

(54) SYSTEM AND METHOD USING IN-SITU ELECTROMAGNETIC DIAGNOSTIC FOR REAL-TIME PROJECTILE CHARACTERIZATION

(71) Applicant: Lawrence Livermore National Security, LLC, Livermore, CA (US)

(72) Inventors: Tammy Chang, San Ramon, CA (US); Rayford Owen Mays, Livermore, CA (US); Joe Tringe, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 262 days.

(21) Appl. No.: 16/835,974

(22) Filed: Mar. 31, 2020

(65) Prior Publication Data

US 2021/0116473 A1   Apr. 22, 2021

Related U.S. Application Data

(60) Provisional application No. 62/916,037, filed on Oct. 16, 2019.

(51) Int. Cl.
*G01P 3/66* (2006.01)
*G01P 3/50* (2006.01)

(52) U.S. Cl.
CPC ............. *G01P 3/665* (2013.01); *G01P 3/50* (2013.01)

(58) Field of Classification Search
CPC .... G01P 3/665; G01P 3/50; G01P 3/68; G01P 3/66; G01S 7/027; G01S 7/412; G01S 7/415; B33Y 10/00; B33Y 30/00; B33Y 40/00
See application file for complete search history.

(56) References Cited

U.S. PATENT DOCUMENTS

| | | | |
|---|---|---|---|
| 6,208,255 B1 * | 3/2001 | Conrad .................. | A01C 7/105 340/684 |
| 7,624,652 B2 * | 12/2009 | Wee ........................ | G01F 1/44 73/861.63 |

OTHER PUBLICATIONS

Wave impedance, Wikipedia, https://en.wikipedia.org/wiki/Wave_impedance (May 21, 2004 ).*
Cabanes-Sempere, M. et al., "Characterization of free falling drops inside a microwave cavity," 2012 IEEE/MT-S International Microwave Symposium Digest, Montreal QC, Canada, 2012, pp. 1-3.

(Continued)

*Primary Examiner* — Son T Le
(74) *Attorney, Agent, or Firm* — HARNESS, DICKEY & PIERCE, P.L.C.

(57) ABSTRACT

The present disclosure relates to a system for detecting characteristics of a moving element. The system may include a tubular housing having a tubular first portion having a first end and a second end, with the first end forming an input port and the second end forming an output port. A source of wireless electromagnetic energy projects a wireless electromagnetic energy signal, travelling in a first direction, into the input port and through an interior area defined by the tubular first portion. A signal processing subsystem detects at least one characteristic of the signal after the signal is reflected back to the first end after having interacted with the element as the element moves past the output port of the housing.

17 Claims, 4 Drawing Sheets

(56) References Cited

OTHER PUBLICATIONS

Cabanes-Sempere, M. et al., "Characterization method of dielectric properties of free falling drops in a microwave processing cavity and its application in microwave internal gelation," Meas. Sci. Technol., vol. 24, No. 9, Sep. 2013, p. 095009.
Pozar, David M. "Microwave Engineering", 4th Ed., Wiley, 2012, pp. 325-327.
Wang, Tianjiao et al. "In-Situ Droplet Inspection and Control System for Liquid Metal Jet 3D Printing Process", 45th SME North American Manufacturing Research Conference, NAMRC 45, LA, USA, Procedia Manufacturing, No. 10, 2017, pp. 968-981.

* cited by examiner

SYSTEM AND METHOD USING IN-SITU ELECTROMAGNETIC DIAGNOSTIC FOR REAL-TIME PROJECTILE CHARACTERIZATION

CROSS-REFERENCE TO RELATED APPLICATIONS

This application claims the benefit of U.S. Provisional Application No. 62/916,037, filed on Oct. 16, 2019. The entire disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates systems and methods for characterizing properties of moving projectiles or particles, and more particularly to systems and methods which make use of electromagnetic fields and impedance changes detected in reflected waves using a waveguide-like structure, to help characterize one or more properties of a projectile or falling particle, in situ, without interfering with the motion of the projectile or particle.

BACKGROUND

The statements in this section merely provide background information related to the present disclosure and may not constitute prior art.

As additive manufacturing techniques become increasingly sophisticated, in-situ diagnostics are becoming increasingly important for ensuring optimal print performance. Present day techniques and technologies for this purpose have typically involved using a high-speed camera to capture backlit images of the droplet shadow of falling dielectric or metallic ink droplets being deposited during an additive manufacturing printing operation. While video files of falling droplets captured during printing can provide a two-dimensional image of the droplet, the high frame-rate video captured is too large to be practically implemented during the full print duration in a final system or to be processed immediately in real time. Instead, using a radio frequency (RF) measurement device could significantly reduce in-situ diagnostic data and enable real-time processing by plotting amplitude variation with time; in other words a one-dimensional result.

Prior work for falling droplet detection has been limited to a cavity-based system which can only determine droplet rate and material properties of a dielectric (not metallic) material. This type of system also requires prior knowledge of droplet size. Cabanes-Sempere et al., "*Characterization method of dielectric properties of free falling drops in a microwave processing cavity and its application in microwave internal gelation*", 2013 Meas. Sci. Technol. 24 095009, used a microwave cavity to produce a heating effect on aqueous droplets to achieve microwave internal gelation and produce nuclear particle fuel. They demonstrated an ability to detect the droplet rate by measuring the perturbance to the returned signal over time. Because this detection device is based on cavity perturbation theory, it is possible to also extract the dielectric material characteristics (electrical permittivity and loss) of the falling droplets.

Accordingly, systems and methods are needed which are able to determine, in-situ, characteristics of projectiles or material droplets while in motion without advance knowledge of the precise dimensions of the projectile or material droplets, and which are not limited to non-metal projectiles or particles.

SUMMARY

In one aspect the present disclosure relates to a system for detecting characteristics of a moving element. The system may comprise a tubular housing having a tubular first portion having a first end and a second end, the first end forming an input port and the second end forming an output port. A source of wireless electromagnetic energy projects a wireless electromagnetic energy signal, travelling in a first direction, into the input port and through an interior area defined by the tubular first portion of the tubular housing towards the second end. A signal processing subsystem may be included which is configured to detect at least one characteristic of the wireless electromagnetic energy signal after the signal has been turned into a reflected signal as a result of being reflected back to the first end, after interacting with an element moving past the output port of the housing.

In another aspect the present disclosure relates to a system for detecting characteristics of a moving element. The system may comprise a tubular T-shaped housing having tubular first and tubular second housing portions arranged non-parallel to one another. The tubular first housing portion includes a first port into which a wireless electromagnetic signal is transmitted. The tubular second housing portion includes an opening in a wall portion thereof in communication with the first port. The tubular second housing portion includes a second port and a third port longitudinally aligned with one another to form a straight path through the tubular second housing portion. The opening in the wall portion is disposed at an intermediate portion of the tubular second housing portion. A source of wireless electromagnetic energy may be included which projects wireless electromagnetic energy into the first port of the tubular first housing portion towards the opening. A signal processing subsystem may be included which detects at least one characteristic of the wireless electromagnetic energy after the wireless electromagnetic energy has interacted with an element travelling through the tubular second housing portion, where the interaction causes the wireless electromagnetic energy to be reflected back as a reflected wireless electromagnetic energy signal to the first port of the tubular first housing portion.

In still another aspect the present disclosure relates to a method for detecting characteristics of a moving element travelling through free space. The method may comprise projecting wireless electromagnetic energy into an input port of a tubular housing towards an output port of the tubular housing, wherein the moving element moves in free space past the output port. The method may also include using a signal processing subsystem to receive the wireless electromagnetic energy after the wireless electromagnetic energy has travelled through the output port, and has interacted with the moving element, and has been reflected back as a wireless reflected electromagnetic energy signal through the tubular housing back to the input port. The method may further include using the signal processing subsystem to analyze the wireless reflected electromagnetic energy signal to detect at least one characteristic of the moving element.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure involves a significant departure from the prior cavity-based systems for performing projectile or droplet characterization. Instead, the present disclosure uses waveguide-based devices and microwave energy to perform characterization of the projectile or droplet. The subject matter of the present disclosure, in particular, addresses the significant challenge of sensing small droplets, that is, droplets typically below 3 mm in size, for additive manufacturing applications, than what has been previously achieved with other types of systems. Because these smaller dimensions typically require higher frequencies, they correspondingly require a smaller RF cavity (whose dimensions are a function of wavelength) when using RF cavity based devices for particle characterization/analysis. Scaling to these smaller sizes presents fabrication challenges for custom, RF cavity-type components, whereas waveguide components are readily available for very high frequency (>30 GHz) applications. In order to circumvent the challenges associated with the fabrication of high performance, miniature, custom components, the present disclosure makes unconventional use of waveguide components for a diagnostic device, and more specifically for characterizing droplet features or characteristics.

Figure 1:
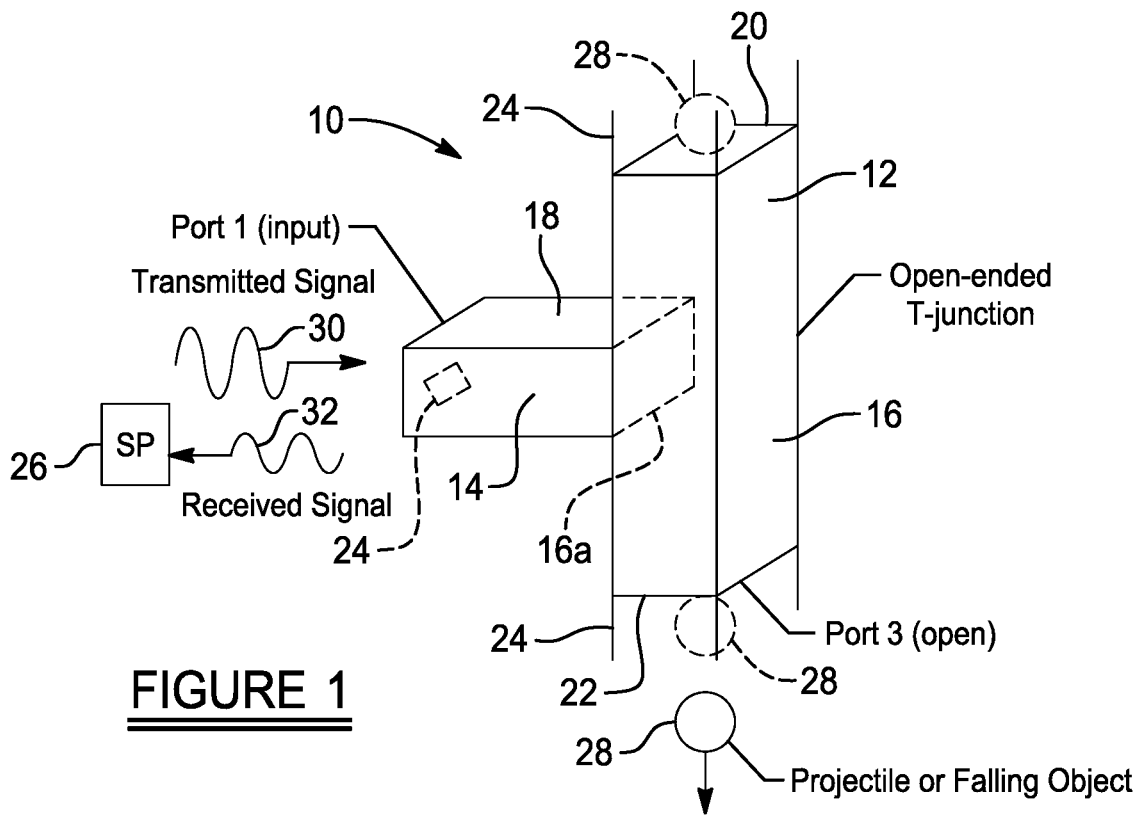
FIG. 1 is a high level diagram of one embodiment of a system in accordance with the present disclosure for in-situ monitoring and characterization of projectiles in flight or falling droplets, using a T-shaped waveguide-like structure and reflected electromagnetic signal, wherein changes in impedance produced by the projectile or droplet produce changes in the reflected signal which can be detected and used to help characterize one or more properties of the projectile or droplet.

Through the use of radio frequency waveguide components, the present disclosure provides embodiments of droplet diagnostic devices which can determine the size, motion (position, velocity, and acceleration), rate, and material properties of a moving element, for example a falling droplet or a projectile in motion. One such embodiment is the diagnostic system 10 shown in FIG. 1. The system 10 of FIG. 1 can be used to monitor a solid or a liquid, as well as metal or dielectric materials, in real-time and in-situ. One such in-situ monitoring application may involve use of the system 10 in an additive manufacturing system to monitor a characteristic or property of ink droplets or granular material feedstock as the ink droplets or material feedstock is deposited on a build plate or a previously formed layer of a part under construction. A particular advantage of the system 10 is that its use is not limited to non-metallic particles or non-metallic projectiles.

The diagnostic system 10 is based on a radio frequency T-junction, which makes of a T-shaped housing 12 having a tubular first portion 14 and a perpendicularly arranged tubular second portion 16. One end of the first portion 14 intersects the second portion 16 along a mid-point of the second portion where an opening 16a is present in the second portion 16. The interior of the first portion 14 thus communicates with an interior area of the second portion 16 through the opening 16a in one wall of the second portion 16. The system 10 thus has three signal ports 18, 20 and 22 in communication with one another, with port 18 acting as an input port, and ports 20 and 22 both being output ports. The output ports 20 and 22 divide power from the input port 18 into each of the two output ports 20 and 22. The housing 12 is preferably made from metal, for example copper or stainless steel, although any material that is suitable for use as a waveguide could be used.

In normal operation, all three ports 18, 20 and 22 of the T-shaped housing 12 are terminated with a predetermined impedance 24, for example a 50 ohm impedance, to improve power transfer efficiency. This is typically done through the use of a fixed impedance termination or an additional waveguide connection with the correct input impedance. For use as a microwave diagnostic, the output ports 20 and 22 of the system 10 can be operated without a 50 ohm termination and instead exposed to open air. A sinusoidal microwave input signal 30, is transmitted into the input port 18 by a suitable waveform generator (not shown), and a signal processing subsystem 26 is used to detect a reflected sinusoidal signal 32 returning through the input port 18. It will be appreciated that the signal processing subsystem 26 could include a signal generator, and thus form a single subsystem for generating both the transmitted signal 30 and detecting the reflected signal 32. A vector network analyzer is one type of signal processing subsystem that may be used to perform the detection of the reflected signal 32.

In operation the transmitted signal 30 is directed into the input port 18 and travels through the first portion 14 and through the opening 16a in the second portion 16 where it contacts a falling droplet 28 (or falling particle or projectile) falling through the second portion 16 of the T-shaped housing 12 toward the output port 22. Under this condition, the magnitude of the reflected signal 32, which is detected at the input port 18 by the signal processing subsystem 26, increases due to the impedance mismatch at the output ports 20 and 22, but the frequency remains constant over time. The system 10 can then use the reflected signal 32 to monitor the resulting impedance effects of the droplet 28 as it falls through its co-linear ports (e.g., into the port 20 and out of port 22 in FIG. 1).

The level of perturbation in the reflected signal 32 detected by the signal processing subsystem 26 can be used to determine a number of important features or characteristics of the droplets 28, including droplet size, shape, and material properties. Also, the temporal variation in the reflected signal 32 can be used to determine characteristics of droplet motion such as velocity and acceleration, as will be discussed further in the following description.

The interior dimensions of the portions 14 and 16 of the T-shaped housing 12 are preferably just slightly larger than the maximum size of the falling droplets 28 (or projectile) passing through the portion 16. As noted in FIG. 1, the portions 14 and 16 each form generally square shapes when viewed in cross-section, although slightly rectangular cross-sectional configurations for the portions 14 and 16 will also work. Furthermore, while the portion 16 of the T-shaped housing 12 is shown having a consistent cross-sectional shape (i.e., perfect rectangle), in some applications it may be desirable to configure portion 16 with a slightly tapering configuration such that input port 20 has a slightly larger cross sectional area than that of the output port 22.

Figure 2:
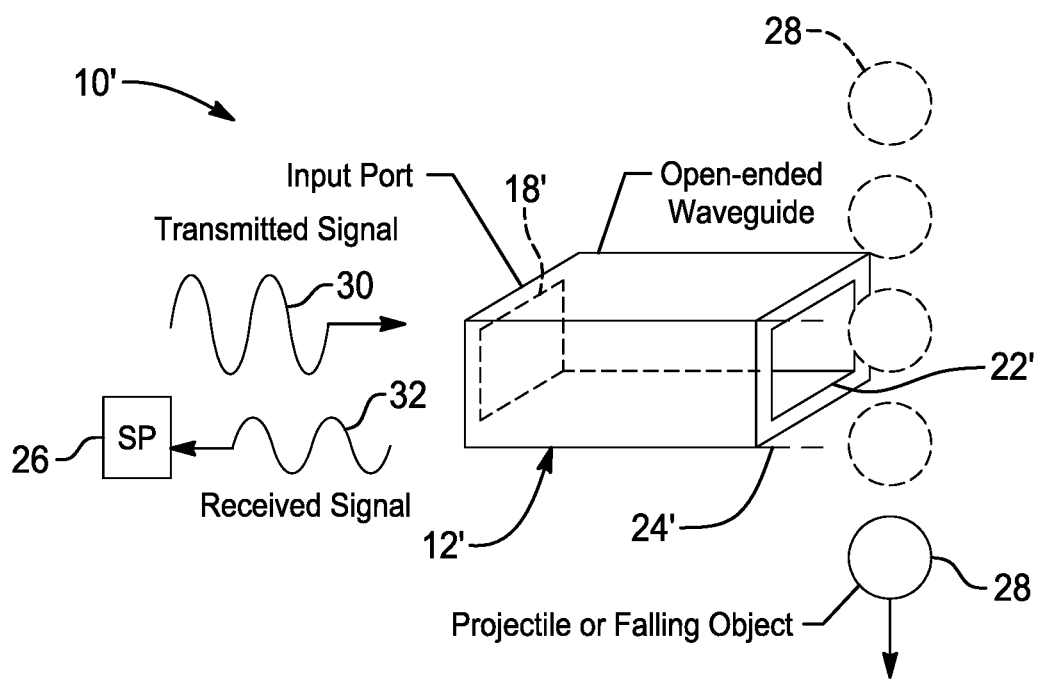
FIG. 2 is another embodiment of a system in accordance with the present disclosure which instead uses an open-ended linear waveguide structure to help monitor and discern characteristics of a projectile or falling droplet moving past an output end of the waveguide structure.

FIG. 2 shows a system 10' in accordance with another embodiment of the present disclosure. The system 10' is based on a linear waveguide that is oriented perpendicular to the droplet 28 stream (i.e., perpendicular to the vertical axis of movement of the droplet 28). The system 10' has a tubular housing 12' which forms the linear waveguide. The tubular housing 12' has an input port 18' communicating with a single output port 22'. The ports 18' and 22' are preferably also terminated with a suitable impedance, for example 50 ohm impedances (not shown in this embodiment) for maximum power transfer. But instead of creating an open air termination at the output port 22' of the tubular housing 12', the tubular housing 12' can be placed with the output port 22' perpendicular to the droplet 28 stream to monitor impedance changes at its output port 22'. This approach avoids the need to fully surround the droplet 28 stream, which is required for the T-shaped housing 12 of system 10 (i.e., the open T-junction configuration).

With the housing 12' of the system 10', falling droplets 28 passing the output port 20' will change the impedance seen at the output port 22' of the housing 12', resulting in a change in the magnitude of the input signal 30, which will be reflected as signal 32 back to the input port 18' and detected by the signal processing subsystem 26. The system 10' thus operates under the general same principles as the open T-junction approach of the system 10, but because of its limited interface with the droplet 28 stream, the tradeoff is a reduced droplet sensitivity and capture time.

Experiments conducted by the co-inventors using a vector network analyzer, a funnel, an optical trigger and ball bearings acting as the droplets 28 (i.e., both dielectric and metal ball bearings were used) have confirmed a strong correlation between maximum reflected signal 32 strength and droplet diameter. The time variation of the reflected signal 32 as the droplet passes through the second portion 16 of the housing 12 (or past the output port 22' in FIG. 2) is reliably indicative of position, velocity and acceleration, and actual measured values have matched with those determined from high-speed video analysis. The systems 10 and 10' of the present disclosure produced excellent shape feature results on an experimental additive manufacturing system which jets liquid metal droplets, and has been used with droplet rates up to 10 Hz (i.e., 10 drops per second).

Figure 3:
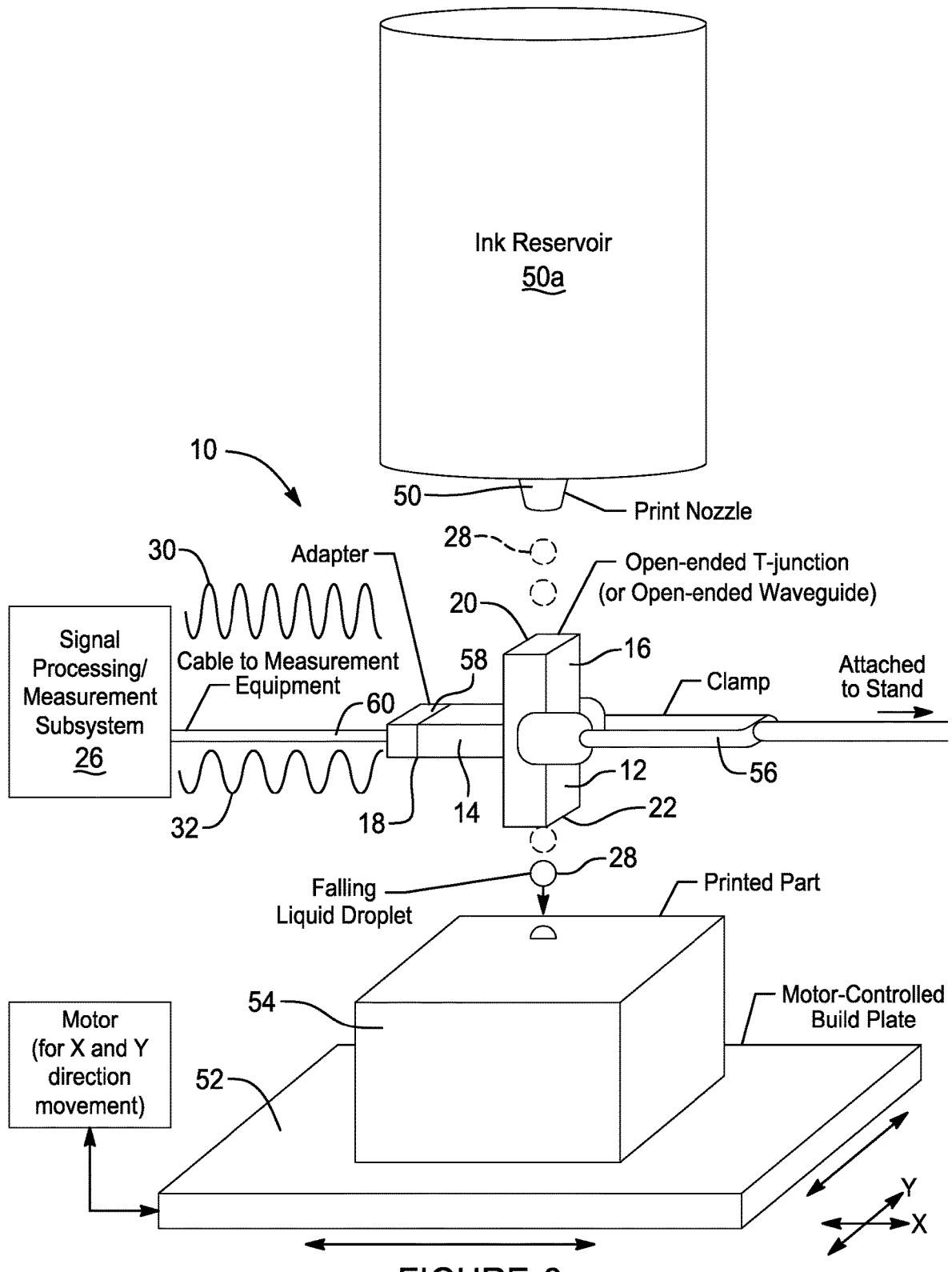
FIG. 3 is a high level perspective illustration of the system of FIG. 1 employed in an additive manufacturing application together with a print nozzle and a build plate to determine characteristics of ink droplets being released from a print nozzle.

FIG. 3 shows a practical application of the system 10, but the system 10' could be implemented in this example just as well. The system 10 is positioned directly underneath a print nozzle 50 and above a motor-controlled build plate 52. The print nozzle 50 receives ink from an ink reservoir 50*a*. A printed part 54 is formed in a layer-by-layer operation by applying a stream of ink droplets 28 from the print nozzle 50 in a predetermined 2D pattern to form each layer of the printed part 54. The T-shaped housing 12 of the system 10 is shown supported by a clamp 56 which holds the T-shaped housing 12 stationary. The clamp 56 may be secured or supported by a stand (not shown). Alternatively, the nozzle/reservoir 50/50*a* assembly may be moved while the build plate 52 is held stationary.

For both of the aforementioned systems 10 and 10', the properties of the droplets 28 can be determined based on the complex (real and imaginary) values of the reflected signal 32. Advantageously, this determination can be performed in real time using conventional, widely available electronic measurement equipment. In this specific example involving printing a 3D part, the real time analysis capability of the systems 10 and 10' enable corrective action to be taken during the printing process if the characteristics (e.g., size) of the droplets 28 should change or vary from predetermined characteristics.

In FIG. 3 the portion 14 of the T-shaped housing 12 is coupled to an adapter 58, which is in turn coupled to an electrical cable 60. The electrical cable 60 may be a coaxial cable which is able to both communicate the sinusoidal input waveform 30 to the input port 14, while also enabling the reflected signal 32 to be communicated back to the signal processing subsystem 26. So in this example the signal processing subsystem 26 functions to both provide the input signal 30 as well as to receive and analyze the reflected signal 32.

Figure 4:
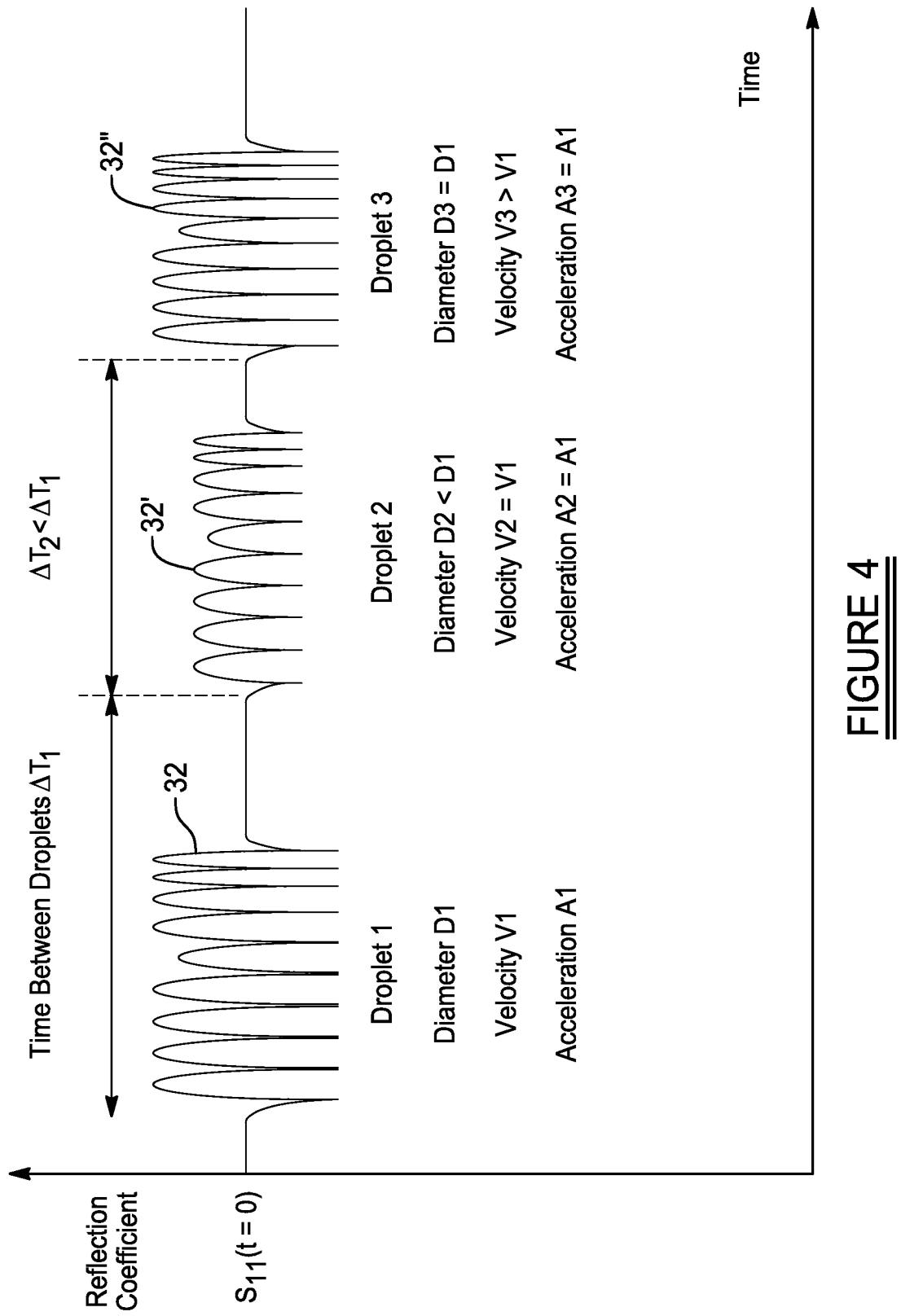
FIG. 4 shows a plurality of reflected waveforms to illustrate how changes in diameter of the projectile or falling particle, as well as its velocity, affect the magnitude or period of the reflected waveform.

Referring to FIG. 4, a graph shows one example of the differences in the reflected signal 32, which was monitored in real time, as the diameter of the droplet 28 and its velocity changes. For this explanation the reflected signal 32 waveform represents the reflected signal created as the droplet 28 (labelled "Droplet 1" in FIG. 4), having a diameter D1, falls through the portion 16 of the T-shaped housing 12 of the system 10 at a velocity of V1 and with an acceleration of A1. Reflected signal 32' waveform shows how the magnitude of the reflected signal changes as a different droplet (labelled "Droplet 2" in FIG. 4) having a smaller diameter than droplet 28, but travelling with the same velocity and acceleration, falls through the portion 16 of the T-shaped housing 12. The period of the reflected signal 32' waveform remains the same as that for reflected signal 32 waveform, and only the waveform amplitude (i.e., magnitude) changes. The reflected signal 32" waveform shows how the period of the reflected waveform changes when the velocity of still another falling droplet (labelled "Droplet 3" in FIG. 4), which is the same diameter as droplet 28 (indicated as Droplet 1 in FIG. 4), increases. The magnitude of the reflected signal 32" remains the same as that for reflected signal 32, but the period of the waveform 32" has been reduced (the acceleration also is the same in this example).

The produced signals in FIG. 4 are a result of the following theoretical formulation. The T-junction operation of the system 10 has been represented in a transmission line model 100 shown in FIG. 5.

Figure 5:
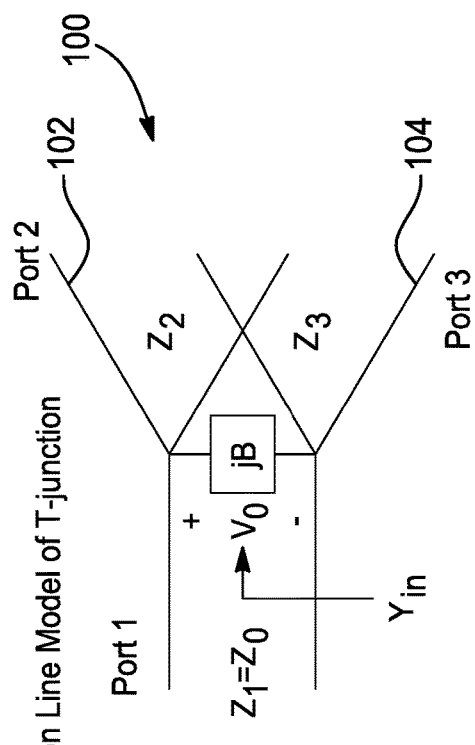
FIG. 5 is a high level transmission line model showing a T-junction to help explain the theory behind the production of the signals shown in FIG. 4.

In FIG. 5, the admittance Yin looking into the junction can be written as $$Y_{in} = \frac{1}{Z_2} + \frac{1}{Z_3} + jB$$

$$Z_{in} = \frac{1}{Y_{in}}$$

where $Z_2$ and $Z_3$ are the characteristic impedances along the length of the T-junction arms 102 and 104, respectively. The reflection coefficient at port 1 is $$\Gamma = \frac{Z_{in} - Z_1}{Z_{in} + Z_1}$$

and the return loss is $S_{11} = -20 \log_{10} |\Gamma|$.

In most cases, the T-junction is designed such that $Z_1 = Z_2 = Z_3 = 50\Omega$, and are terminated with a 50 load impedance, typically a matched rectangular waveguide structure. However, the system (i.e., transmission line model 100) presented here has no physical termination at ports 2 and 3 of the T-junction transmission line model, and instead, $Z_L = \eta$, where $\eta = 377\Omega$ for the characteristic impedance of free space. Because the arms 102 and 104 along port 2 and port 3 are no longer terminated with a matched load, $Z_2$ and $Z_3$ are now as follows:

$$Z_2 = Z_3 = Z_0 \frac{Z_L + jZ_0 \tan \beta l}{Z_0 + jZ_L \tan \beta l} = Z_0 \frac{\eta + jZ_0 \tan \beta l_0}{Z_0 + j\eta \tan \beta l_0}$$

where $l = l_0$ is the length of the T-junction arm, and $\beta = 2\pi/\lambda$ where $\lambda$ is the wavelength of the transmitted sinusoidal signal. The return loss can then be found using the equations above, where $Z_1 = 50\Omega$ is unchanged.

When a droplet enters the upper arm 102 of the transmission line model 100 (port 2), the assumptions that $Z_L = \eta$ and $l = l_0$ no longer hold. The droplet has an associated impedance $Z_d$, and $I = I(t)$ is now a function of time. As the droplet enters the T-junction through the upper arm 102, $$Z_2(t) = Z_0 \frac{Z_d + jZ_0 \tan \beta l(t)}{Z_0 + jZ_d \tan \beta l(t)}$$

$$Z_3 = Z_0 \frac{\eta + jZ_0 \tan \beta l_0}{Z_0 + j\eta \tan \beta l_0}$$

and a symmetric phenomenon occurs as the droplet passes into the lower arm 104 of the T-junction transmission line model 100. The return loss $S_{11}$ now becomes a function of time, $S_{11}(t)$.

As a result of the aforementioned formulation, it is possible to associate droplet size and/or material properties from $Z_d$, as well as droplet dynamics associated with time $t = t_0$ and position $l(t_0)$ by examining the measured $S_{11}$ waveform. For liquid droplets which may change temperature as they are ejected from a high temperature print nozzle into a lower temperature environment, it is possible to extract the temperature by evaluating the change in electrical properties over the droplet time-of-flight.

Figure 6:
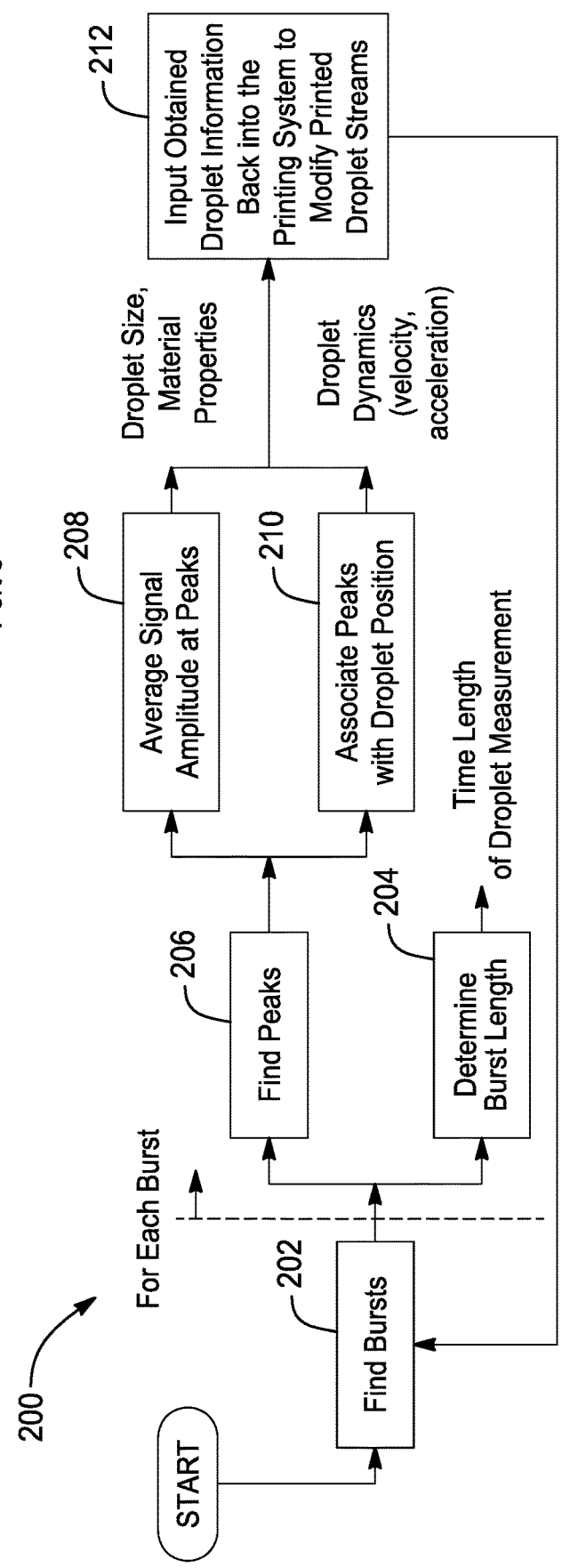
FIG. 6 is a flowchart showing one example of a signal processing methodology for used to interpret the measured waveforms of FIG. 4.

The signal processing approach used to interpret the measured waveforms is shown in the flowchart 200 of FIG. 6. First, the start and stop times of bursts, such as the three bursts associated with three droplets in FIG. 4, are determined, as indicated at operation 202. The length of each signal burst indicates the length of time over which the droplet 28 is characterized by the waveguide system 10 or 10'. For each signal burst, the time (at operation 204) and amplitude at each signal peak, indicated at operation 206, is extracted. The amplitude at these peaks are averaged, as indicated at operation 208, and can be associated with calibrated data to determine droplet size and material properties. Additionally, by associating each peak point with the vertical droplet position in space, as indicated at operation 210, dynamics such as velocity and acceleration of the droplet can be established. With the addition of suitable control software, it is possible to input the obtained droplet information back into the printing system, as indicated by operation 212, to modify printed droplet streams for the required parameters in a feedback loop.

The present disclosure is expected to find utility in a number of diverse applications in addition to droplet or inkjet-based additive manufacturing in-situ diagnostic applications. For example, and without limitation, such other applications are expected to involve performing diagnostics on elements such as projectiles for defense applications, on grain or seed characterization for agricultural applications, in connection with food quality monitoring in production facilities, and liquid or nanoparticle content monitoring in chemical labs and facilities. Potentially any small object in free motion, whether falling by gravity or placed in motion by some other propulsion means, may be analyzed using the systems 10 and 10' described herein.

The systems 10 and 10' provide the additional advantage that they do not require significant modifications to existing additive manufacturing systems; all that is required is space for the T-shaped housing 12 to be placed below a print nozzle and above a build plate, or open-ended waveguide 12' to be placed perpendicular to the droplet stream. No other changes to the additive manufacturing system itself are required. As such, the system 10 (or 10') can be easily retrofitted to existing AM printing systems at only a relatively small additional cost. Importantly, the system 10 (and 10') works well to detect characteristics of both metal particles and non-metal particles, with no changes to the hardware of the system 10 (or 10') required to sense either type of particle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for detecting characteristics of a moving element, comprising:
   a tubular housing having a tubular first portion having a first end and a second end, the first end forming an input port and the second end forming an output port;
   a source of wireless electromagnetic energy which projects a plurality of bursts of transmitted wireless electromagnetic energy signals, travelling in a first direction, into the input port and through an interior area defined by the tubular first portion of the tubular housing;
   a signal processing subsystem which records a start time, a stop time, and a length of each one of said plurality of bursts of transmitted wireless electromagnetic energy being recorded;
   the signal processing subsystem configured to analyze a change in amplitude of a plurality of reflected wireless electromagnetic energy signals produced when the plurality of bursts of transmitted wireless electromagnetic energy signals are reflected in a second direction, opposite to the first direction, back through the interior area of the tubular first portion after interacting with a plurality of elements moving past the output port of the housing;
   the signal processing subsystem further configured to analyze the change in the amplitude of the plurality of reflected wireless electromagnetic energy signals caused by a change in impedance at the output port of the tubular housing, by averaging together detected peak signal amplitudes for said plurality of received wireless electromagnetic energy signals to determine an average peak amplitude value, and then evaluating the average peak amplitude value with calibrated data to determine at least one of size or material properties of the moving element; and
   the tubular housing configured to route the plurality of reflected wireless electromagnetic energy signals therethrough in the second direction such that the plurality of reflected wireless electromagnetic energy signals remain in wireless form while travelling back to the input port.

2. The system of claim 1, wherein the tubular housing further comprises a tubular second portion arranged perpendicular to the tubular first portion, and including an input port at one end and an output port at its opposing end, and wherein the input port is configured to receive the element, and the output element is configured to allow the element to exit the tubular second portion.

3. The system of claim 2, wherein the tubular second portion comprises a square cross-sectional shape.

4. The system of claim 3, wherein the tubular second portion is larger in cross-sectional area than a cross-sectional dimension of the element, to enable passage of the element unimpeded through the tubular second portion.

5. The system of claim 2, wherein the second housing portion comprises a tapering cross-sectional shape such that the input port is larger than the output port.

6. The system of claim 2, further comprising a first termination impedance coupled to the first end of the tubular first portion, a second termination impedance coupled to the input port of the tubular second portion, and a third termination impedance coupled to the output port of the tubular second portion.

7. The system of claim 1, wherein the tubular first portion comprises a square shape.

8. The system of claim 1, wherein the at least one of amplitude or phase of the plurality of reflected wireless electromagnetic signals is correlated to at least one of a diameter of the element or a shape or material property of the element.

9. The system of claim 1, wherein the signal processing subsystem is configured to detect a period of the plurality of reflected wireless electromagnetic energy signals, and wherein the period is correlated to an acceleration of the moving element.

10. The system of claim 1, wherein the signal processing subsystem is further configured to associate a peak point of each one of the plurality of reflected wireless electromagnetic energy signals received in response to each said burst of transmitted wireless electromagnetic energy signals, with a position of the moving element, and to use the peak points to help determine positions of the moving element in space, and from the positions in space of the moving element, to determine at least one of velocity and acceleration of the moving element.

11. A system for detecting characteristics of a moving element, comprising:
a tubular T-shaped housing having tubular first and tubular second housing portions arranged non-parallel to one another;
the tubular first housing portion including a first port into which a plurality of bursts of transmitted wireless electromagnetic signals are transmitted;
a first termination impedance associated with the first port;
the tubular second housing portion including an opening in a wall portion thereof in communication with the first port;
the tubular second housing portion including a second port and a third port longitudinally aligned with one another to form a straight path through the tubular second housing portion, the opening in the wall portion being disposed at an intermediate portion of the tubular second housing portion, and the second port having a second termination impedance and the third port having a third termination impedance;
the tubular first and second housing portions having interior dimensions being just slightly larger than a maximum size of the moving element;
a source of wireless electromagnetic energy which projects the plurality of bursts of transmitted wireless electromagnetic signals into the first port of the tubular first housing portion towards the opening; and
a signal processing subsystem configured to analyze an amplitude and a period of reflected wireless electromagnetic energy signals produced after the plurality of bursts of transmitted wireless electromagnetic signals have entered the tubular second housing portion and interacted with the moving element as the moving element travels through the tubular second housing portion, and has been reflected back as the plurality of reflected wireless electromagnetic energy signals through a length of the tubular first housing portion to, and through, the first port of the tubular first housing portion, the plurality of reflected wireless electromagnetic energy signals being generated by an impedance mismatch between the second and third termination impedances; and
wherein the signal processing subsystem is further configured to analyze the change in the amplitude of the plurality of reflected wireless electromagnetic energy signals, by averaging together detected peak signal amplitudes for said plurality of received wireless electromagnetic energy signals to determine an average peak amplitude value, and then evaluating the average peak amplitude value with calibrated data to determine at least one of size or material properties of the moving element.

12. The system of claim 11, wherein the tubular first housing portion and the tubular second housing portion of the tubular T-shaped housing each comprise a square shape.

13. The system of claim 11, wherein
the period of the reflected wireless electromagnetic energy signal is correlated to at least one of a velocity or an acceleration of the moving element as the moving element travels past the opening in the wall portion of the tubular second housing portion.

14. The system of claim 11, wherein the tubular second housing portion comprises a tapering cross-sectional shape such that the second port is larger than the third port.

15. A method for detecting characteristics of a moving element, comprising travelling through free space, the method comprising:
projecting a plurality of bursts of transmitted wireless electromagnetic energy into an input port of a tubular housing towards an output port of the tubular housing, wherein a moving element moves in free space past the output port;
using the tubular housing to receive and channel back to the input port a plurality of received reflected wireless electromagnetic energy signals produced after the transmitted wireless electromagnetic energy has travelled through the output port, has interacted with only with the moving element, and has been reflected back only by the moving element as the plurality of reflected wireless reflected electromagnetic energy signals as a result of a change of impedance at the output port caused by the moving element;
using the signal processing subsystem to analyze an amplitude of the plurality of received reflected wireless reflected electromagnetic energy signals to detect at least one characteristic of the moving element; and
wherein using the signal processing subsystem to analyze an amplitude further includes analyzing a change in the amplitude of the plurality of received reflected wireless electromagnetic energy signals, by averaging together detected peak signal amplitudes for said plurality of received reflected wireless electromagnetic energy signals, to determine an average peak amplitude value, and then evaluating the average peak amplitude value with calibrated data to determine at least one of size or material properties of the moving element.

16. The method of claim 15, wherein using the signal processing subsystem to analyze the plurality of received reflected wireless electromagnetic energy signals comprises using the signal processing subsystem to analyze a magnitude of the plurality of received reflected wireless electromagnetic energy signals, wherein the magnitude is indicative of a size, a shape or a material property of the moving element.

17. The method of claim 15, wherein using the signal processing subsystem to analyze the plurality of received reflected wireless reflected electromagnetic energy signals comprises using the signal processing subsystem to detect a period of the plurality of received reflected wireless electromagnetic energy signals, wherein the period is correlated to at least one of a velocity or an acceleration of the element as the element travels past the output port.

* * * * *